United States Patent

[11] 3,562,553

[72] Inventor Allen R. Roth
333 Carousel Place, Anaheim, Calif. 92806

[21] Appl. No. 769,336
[22] Filed Oct. 21, 1968
[45] Patented Feb. 9, 1971

[54] MULTIPLIER CIRCUIT
5 Claims, 4 Drawing Figs.

[52] U.S. Cl. .......... 307/229, 235/194, 307/251, 307/304, 328/160
[51] Int. Cl. .......... G06g 7/12
[50] Field of Search .......... 307/229, 304, 251; 328/160; 235/194

[56] References Cited

UNITED STATES PATENTS

| | | | |
|---|---|---|---|
| 3,368,066 | 2/1968 | Miller et al. | 235/194 |
| 3,487,164 | 12/1969 | Eggert | 235/194X |

*Primary Examiner*—Stanley D. Miller, Jr.
*Attorney*—Spensley, Horn & Lubitz

ABSTRACT: A multiplier including field effect transistor (FET) devices wherein an FET correction means is employed to substantially minimize nonlinearity and error in multiplier operation.

PATENTED FEB 9 1971 3,562,553

ALLEN R. ROTH
INVENTOR.

BY Sprunsley & Horn

ATTORNEYS

MULTIPLIER CIRCUIT

BACKGROUND OF THE INVENTION

It is generally well known to employ FET devices in multiplier circuits. The term "multiplier circuit or means" as employed herein refers to a circuit wherein two input signals (e.g., variables or constants) are supplied to the circuit and an output signal is provided which is representative of the product of the two input signals. One well known multiplier circuit employing FET devices is shown in FIG. 1B. In this type of multiplier circuit, the drain electrodes (D) are coupled to a first input signal with the signal applied to one of the drain electrodes 180° out of phase (or inverted) with respect to the signal applied to the other drain electrode. Similarly, a second input signal is applied to the gates of the FET with one of the signals inverted with respect to the other signal. Thus, the drain to source resistances are varied by the input signal applied to the gates (which to a limited extent interact with the other applied voltages) and the other input signal varies the voltage across the drain to the source electrodes. Since a FET is a good voltage variable resistor, proper biasing and peripheral circuit design yields relatively good multiplier operation. While the prior art circuit has the advantage of being simple, it has the distinct disadvantage of having a nonlinearity in the output signal (which is the signal representative of the product of the two inputs). This nonlinearity is illustrated in FIG. 1A and is designated therein as error.

The product part of the multiplier circuit output signal may be represented as $K_1V_1V_2$ with the above mentioned nonlinearity represented by the term $\underline{K_2V_1^2}$. In general, $K_2$ is negative with respect to $K_1$ and is about 2—5 percent of $K_1$ in a typical FET device. This, of course, varies with different FET's and drain levels. An easy way to understand this nonlinearity is to consider that whichever drain is negative causes the FET device to have a slightly lower drain to source resistance. Thus, a negative $V_1$ shows on the sources. This happens twice for each cycle of input signal $V_1$ and is thus a second order harmonic effect. With input signal $V_2$ equal to zero, a near perfect null is not achieved. Thus, the output signal on the multiplier rather than being a perfect analogue of the product of the two input signals times a constant includes the product signal plus the nonlinearity signal. This error has been referred to in prior art publications as distortion. For example see "An Analogue Multiplier Using Two Field Effect Transistors" by W. H. Highleyman et al. IRE, Transactions on Communication Systems (Sept. 1962), pg. 311, 313, 317.

It can be seen that in multiplier circuits accuracy and precision is of utmost importance. The existence of the nonlinearity error has tended to either limit the application of FET devices to somewhat coarse applications or to provide for the error by means exotic circuitry which tends to defeat the simplicity and appeal of the FET device as a multiplier.

This invention substantially minimizes the nonlinearity error by the addition of relatively simple circuitry. With the nonlinearity error reduced, the field effect multiplier may be applied to high frequency applications heretofore at best extremely difficult to achieve. For example, A DC to 4 MHz. multiplier is readily achieved by the present invention with DC to 10 MHz. clearly possible.

BRIEF DESCRIPTION OF THE DRAWINGS

An embodiment of this invention is described in connection with the FIGS. wherein.

DETAILED DESCRIPTION OF THE INVENTION

Figure 1A:
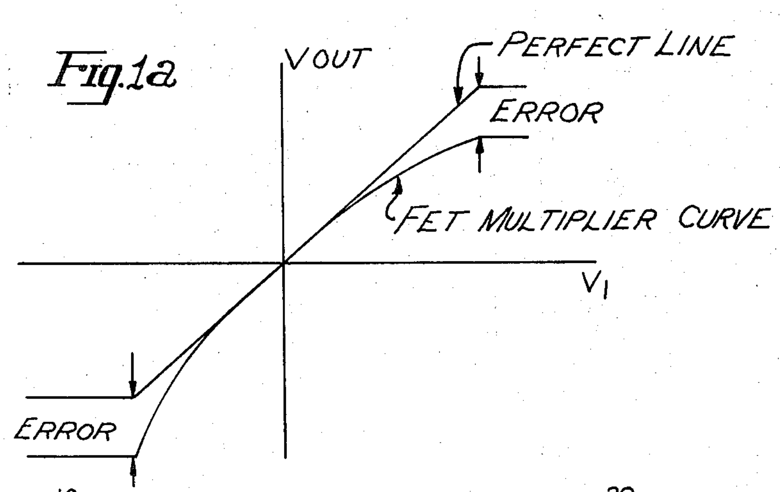
FIG. 1A is a schematic graph of the nonlinearity which occurs in prior art multipliers.
Figure 1B:
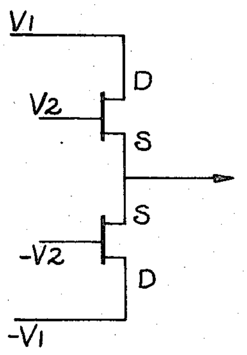
FIG. 1B is a simplified circuit diagram of a typical prior art FET multiplier circuit.
Figure 2:
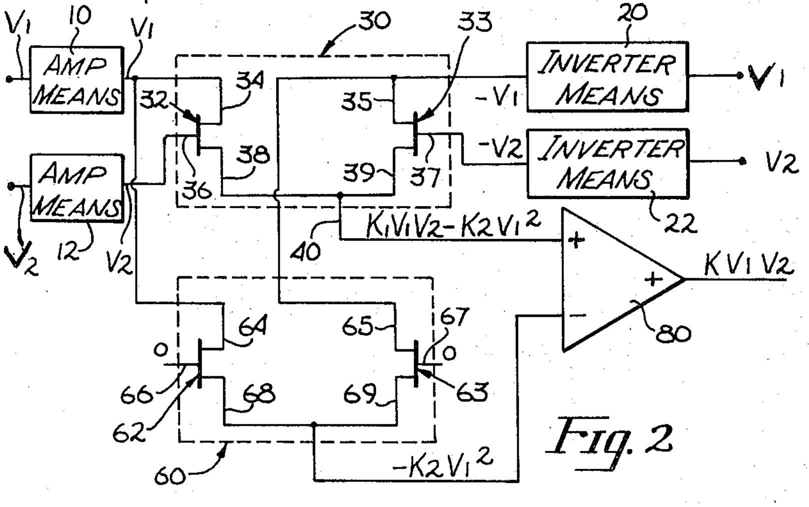
FIG. 2 is a simplified circuit schematic of one embodiment of the invention.

The multiplier system shown in FIG. 2 comprises input amplifier means 10 and 12, input inverter means 20 and 22, multiplier means 30, correction means 60 and combining means 80. The multiplier means 30, is as described above in connection with FIG. 1B and includes a plurality of FET's that is, first FET 32 and second FET 33, each having a first electrode 34, 35, a second electrode 36, 37 and a third electrode 38, 39. Typically, the first electrode 34, 35 is coupled to the drain, the second electrode 36, 37 is coupled to the gate and the third electrode 38, 39 is coupled to the source. The particular FET devices employed in the multiplier means 30 may be either channel type (of P-type or N-type) and by rearrangements, one of the devices may have one channel type and the other device a different channel type. In such an arrangement it would be unnecessary to invert part of the input signal. Metal-oxide-silicon transistors or junctions may be used.

The correction means 60 includes a plurality of FET devices, that is a third FET 62 and a fourth FET 63, each having a first electrode 64, 65, a second electrode 66, 67 and a third electrode 68, 69. Like in the FET devices employed in multiplier means 30, the first electrodes are connected to the drain, the second electrodes are connected to the gates and the third electrodes are connected to the sources.

The input signals $V_1$ and $V_2$ are supplied to input amplifier means 10 and 12 and to input inverter means 20 and 22. Typically the amplifier means 10 and 12 are noninverting differential amplifiers having a +1 gain. Typically the inverter means are inverting differential amplifiers having a −1 gain. The amplifier means 10 and inverter means 20 both receive input signal $V_1$ and supply the properly conditioned input signals to drain electrodes 34, 35 of the multiplier means 30. The signal applied to the electrode 35 is 180° out of phase or inverted with respect to the signal supplied to the electrode 34 with both signals having substantially equal magnitudes. The same input signals, not necessarily of the same amplitude, that are supplied to electrodes 34, 35 are also supplied to electrodes 64, 65 of the correction means 60. Thus the drains of the FET devices in both the multiplier means 30 and the correction means 60 are driven in a push-pull manner with the same signal. The push-pull arrangement is used so that the output is zero when the gate signal is zero. Other configurations may also be used where ½ of the input drain signal is present on the sources and must be canceled with a bridge arrangement and a differential amplifier. This method is restricted in bandwidth.

The amplifier means 12 and inverter means 22 have input signals $V_2$ applied thereto and have their outputs $V_2$ and $-V_2$ coupled to second electrodes 36, 37 respectively of multiplier means 30. Thus the gates of the FET devices in the multiplier means are also driven in a push-pull manner. All of the third electrodes 38, 39, 68, and 69 of the FET devices in both the multiplier and correction means are coupled to the combining means 80. More specifically, the third electrodes 38, 39 of multiplier means 30 (e.g., the sources) are coupled to one terminal of combining means 80 while third electrodes 68, 69 (e.g., the sources) of the correction means 60 are coupled to the other terminal of combining means 80. Typically, combining means 80 is a differential amplifier. The output of 80 is proportional to the difference of the input signals and the error cancels.

In operation, input signals $V_1$ and $V_2$ are supplied to multiplier means 30 by amplifier means 10 and 12 and inverter means 20 and 22 which drive the FET devices 32 and 33 in a push-pull manner. The output signal from multiplier means 30 provided on output 40 has a value of $K_1V_1V_2-\underline{K_2V_1^2}$. This output signal is supplied to differential amplifier 80 which is also supplied with a signal $-\underline{K_2V_1^2}$. This later input signal is supplied by correction means 60 which employs the two FET devices as a second harmonic or distortion generator, driven with an input signal substantially identical to that supplied to the drains of multiplier means 30. The signal generated by correction means 60 is substantially identical to the nonlinearity signal in the multiplier means output. The differential amplifier 80 combines the outputs of the correction and multiplier means and provides the output signal $K_1V_1V_2$. The signal approaches a true product signal without linearity error. The correction FET's 30 may be driven with signals larger than that driving the drains of FET's 30. The amplifier 80 would then have a combining adjustment for best cancellations.

The multiplier built in accordance with the above described invention has the following typical characteristics: (*a*) Transfer function (nominal)—the $I_0=\frac{XY}{K}$.(*b*) linearity—± ½ percent FS (*c*) frequency range—DC—MHz.

Figure 3:
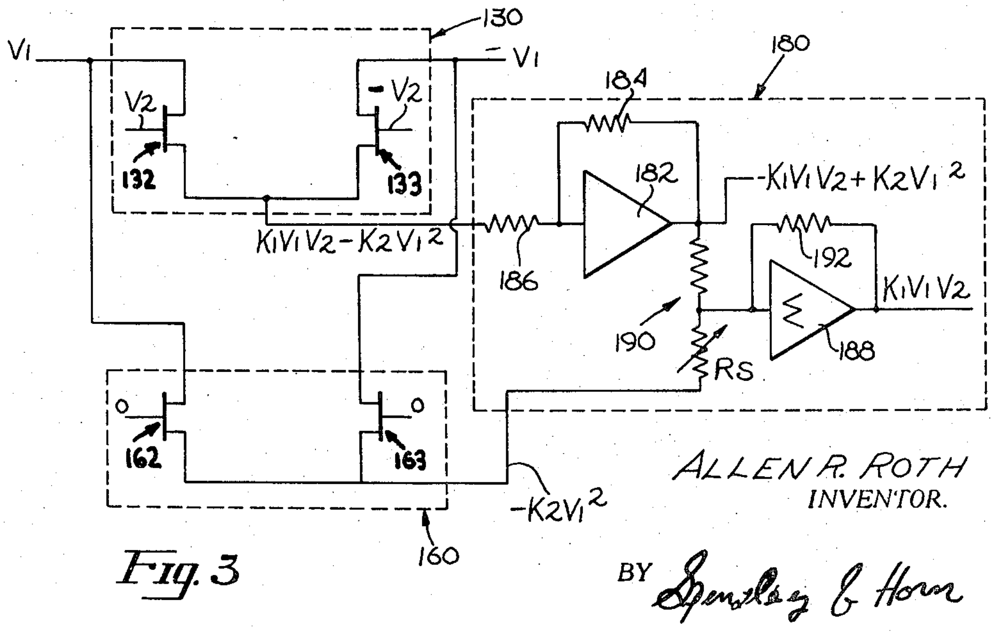
FIG. 3 is a simplified electrical schematic of another embodiment of the invention.

An alternate embodiment of the invention is shown in FIG. 3. The system in FIG. 3 is identical to FIG. 2 with the exception that the combining means, that is the amplifier circuit shown in FIG. 2, is replaced by a different combining means 180. The combining means 180 comprises an inverting feedback amplifier 182 having a feedback resistor 184 and an input resistor 186. The output of amplifier 182 (minus $K_1V_1V_2 + K_2V_1^2$) is coupled to an inverting feedback operational amplifier 188 via dividing network 190. Amplifier 188 includes a feedback resistance 192. The error term is summed via RS to cancel the error present in the output of amplifier 182. The output from amplifier 188 is the desired value $K_1V_1V_2$. The advantage of using a combining means 180 is that it eliminates the requirement for a high degree of common mode rejection such as required in combining as frequencies above 500 kc. it is extremely difficult to obtain such common mode rejection.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A multiplier comprising:
   a field effect transistor multiplier means for receiving two input signals and for generating an output signal representative of the products of said input signals, said output signal containing a nonlinearity;
   a field effect transistor correction means for receiving only one of said input signals and providing an error correction output signal having a magnitude that tends to reduce said error signal; and
   means for combining the output signal from said multiplier means and said correction means to reduce said nonlinearity whereby an output product signal is provided with the nonlinearity reduced by an order of magnitude.

2. The multiplier defined in claim 1 wherein said correction means includes a plurality of field effect transistor devices.

3. The multiplier defined in claim 2 wherein said multiplier means includes a plurality of field effect transistor devices.

4. The multiplier defined in claim 3 wherein said one input signal coupled to those said correction means and said multiplier means is coupled to the same electrode of a field effect transistor device in said multiplier means and said correction means.

5. The multiplier defined in claim 1 wherein said multiplier means comprises:
   a first field effect transistor and a second field effect transistor;
   said correction means comprises a third field effect transistor and a fourth field effect transistor;
   said field effect transistors each having first, second and third electrodes, said first electrode in said field effect transistors coupled to input signals having not necessarily substantially equal magnitudes;
   said second electrodes in said field effect transistors of the multiplier means coupled to input signal having substantially equal magnitudes;
   said second electrodes in said field effect transistors in the correction means coupled to substantially equal potentials;
   said third electrodes in said field effect transistors coupled to the means for combining.